April 3, 1928.

L. O. FRENCH

ELECTROMAGNETIC VALVE

Filed Jan. 27. 1926

1,664,613

INVENTOR.
Louis O. French

Patented Apr. 3, 1928.

1,664,613

UNITED STATES PATENT OFFICE.

LOUIS O. FRENCH, OF MILWAUKEE, WISCONSIN.

ELECTROMAGNETIC VALVE.

Application filed January 27, 1926. Serial No. 84,102.

The invention relates to electromagnetically-operated valves, and more particularly to one suitable for use in the fuel-feeding or fuel-injection systems of high speed internal combustion engines, to control the amount of fuel supplied to the engine.

One object of the invention is to provide an electromagnetically-operated valve in which the valve is operated by an iron-clad electromagnet having a fluid-tight pole face cooperating with a casing member to form a housing for the valve, the pole face being made fluid-tight by packing interposed and clamped between the inner and outer poles.

Another object of the invention is to provide a valve of the type above described in which the operating-magnet for the valve is of simple construction and arranged to readily receive the coil or permit of its replacement.

A further object is to provide a high speed fluid-control valve of simple construction which may be economically manufactured and easily serviced.

A further object of the invention is to provide certain improvements in electromagnetic valves over that shown and described in my copending application Ser. No. 66,769, filed Nov. 4, 1925.

The invention further consists in the several features hereinafter set forth and more particularly defined by claims at the conclusion hereof.

In the drawings, Fig. 1 is a plan view of an electromagnetically-operated valve embodying the invention;

Figure 1:
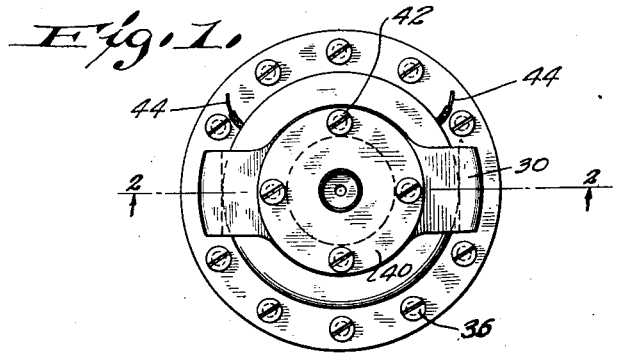

In the drawings the numeral 5 designates a casing member, 6 the control valve, 7 the valve seat member having an opening 8 therein, 9 a seat-clamping member, 10 the electromagnet, and 11 the valve-closing spring.

The casing member 5, of non-magnetic material, has a flat annular leveling surface portion 12, a recess 13, a valve guide bore 14, bores 15 and 16, and a reduced threaded end 17, here shown as fitting within a threaded opening in the plug or member 9 secured to the cylinder head 18 of an internal combustion engine. The member 9 has an annular flange 19 engaging a flange 20 on the member 7 which is clamped thereby against the lower end of the casing 5.

The control valve 6 includes a needle valve 21 and an armature 22 which may have a plate 23 of non-magnetic material inset therein or secured thereto in any suitable manner so as to project slightly above the top of the armature to prevent any possibility of freezing. One or more grooves 24 may be provided across said plate 23 or the top of the armature, and one or more holes (not shown) may be provided in the armature beyond the stem for ready passage or displacement of fuel from one side of the valve to the other.

Figure 2:
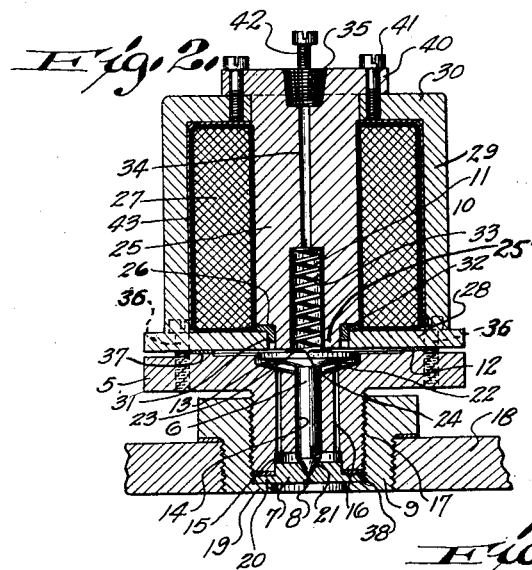
Fig. 2 is a detail vertical sectional view taken on the line 2—2 of Fig. 1.
Figure 3:
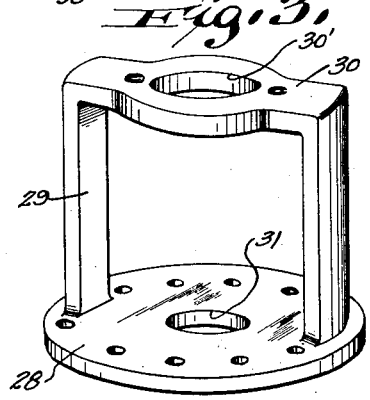
Fig. 3 is a perspective view of a part of the magnet.

The electromagnet 10 comprises a centrally disposed soft iron or soft steel core 25, having a reduced inner pole portion 25' providing an annular shoulder 26, an energizing coil 27, and a member forming an outer pole and a return magnetic circuit from said outer pole to the outer end of the core 25. This member, which may be readily made as a casting or drop-forging, includes an annular pole portion in the form of a flat disk 28, as shown in Figs. 1 to 3, inclusive, or a dished disk 28', as in Fig. 4, and a yoke portion 29, the transverse part 30 of which has an opening 30' in which the outer end of the core has a tight pressed fit so as to secure good magnetic conductivity between these parts. The pole portion 28 or 28' has a centrally disposed opening 31 of slightly larger area than the area of the inner pole but less than the area of the core so that a gasket or packing 32, of soft copper, lead, paper, brass, bronze or any other suitable non-magnetic material, disposed against the shoulder 26 is clamped between said core and said outer pole so that the magnet has a fluid-tight pole face. With this arrangement the inner edge of the outer pole is only a short distance from the inner pole so that the magnetic lines of force flowing from one pole to the other are highly concentrated over a small area, with the result that the armature 22 of the valve may have a relatively small area and overlie the outer pole for a short distance, that is, the area of the armature need only exceed slightly the area of the inner pole. This arrangement is important to the successful working of the device at high speeds, as the reduced area of the armature reduces the weight of the valve and, what is more important, reduces the displacement area of the armature and thus reduces the valve's inertia and resistance to movement through the liquid in which it works without impairing the superior tractive effort attained by the iron-clad magnet upon the armature, which should be strong enough to accommodate high fuel pressures that may be used and acting to close the valve, and the relatively strong spring pressures that may be used for a quick release and rapid closing action.

The coil 27 may be of the spool type, suitably insulated, and the design of the yoke 29 is such that the coil may be inserted laterally between the arms of said yoke and be held in position by the core 25 passing through it.

The spring 11 bearing upon the top of the valve extends up into a bore 33 communicating by a passage 34 with a tapped hole 35 for connection with the fuel supply.

The pole face of the magnet 10 and the casing member 5 are secured together to form the housing for the valve. As shown, this connection is made between the parts 28 or 28' and the member 5 by screws or bolts 36 passing through or into those parts and clamping them together, and a gasket 37 of metal, paper or other suitable material, is interposed between the face or surface 12 and the outer pole.

A washer or washers 38, of paper or other suitable material, of varying thickness may be interposed between the seat member 7 and the casing 5 so as to maintain the upper face of the armature proper on a level with the face 12 of the casing so that the clearance or air gap distance between said armature and magnet is determined by the gasket 37 which, when clamped between the casing and the magnet, is of a thickness to provide the proper working air gap. The distance between the armature and the poles is less than the distance between the poles themselves so that when the coil is energized most of the lines of force will pass from the inner pole to the armature and from said armature to the outer pole, thereby attracting said armature to the poles. In case the valve or its seat wears down, thus increasing this air gap, removal of one of the washers 38, or the substitution of a thinner for a thicker washer, will, upon a reassembly of the parts, again bring the armature to the desired working position. Thus, the levelling of the armature with the surface 12 by the adjustment of the valve seat relative to the casing may be readily accomplished by a straight edge and without the use of special measuring tools, even though the working clearance or air gap distance is extremely small, as, for instance, two or three thousandths of an inch.

Figure 4:
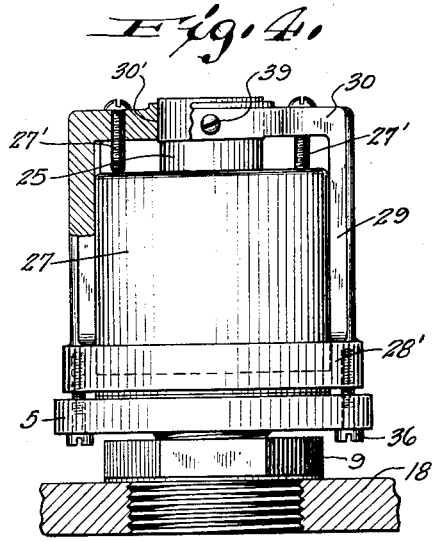
Fig. 4 is an elevation view of a slightly modified form, parts being broken away and parts being shown in section.

In the construction shown in Fig. 4, the core is initially positioned in the magnet by use of a suitable press (not shown), and after being pressed into position may, if necessary, be positively locked by a set-screw 39 mounted in the transverse part of the yoke, and the coil is held seated in the recessed part 28' by screws 27' extending through the yoke. The core 25 may, as shown in Fig. 2, be provided with a flange or flanges 40, and screws 41 passing through said flange or flanges and into threaded holes in the transverse portion of said yoke which are used to draw the core down to operative position relative to said yoke and the packing 32, and in case the coil needs repair the core may be removed by providing threaded holes to receive backing-off screws 42, or bolts, which may be turned down against the face of the yoke and thus react against it to force a withdrawal of the core from the pole.

The coil 27 may be provided with a protective casing 43 of suitable material, and the leads 44 may be readily brought out for connection with a battery or other suitable source of current supply. When the coil is energized the magnet will attract the armature and thus open the valve, and the length of time the valve is open, together with the area of the discharge passage and the pressure or velocity of the fluid, will determine the amount of fuel delivered. The valve may be used in various ways. For instance, it may be used in the systems shown and described in my copending applications Serial No. 728,805, filed July 28, 1924, and Serial No. 1,328, filed Jan. 8, 1925, in the discharge line, or it may be used in the systems of my copending applications Serial No. 660,840, filed Sept. 4, 1923, and Serial No. 712,830, filed May 12, 1924, associated with the supply side of a fuel pump. Hence, I do not intend to specifically limit myself to the use of this valve as an injector valve, nor is the invention to be limited to any particular form or arrangement of parts except in so far as such limitations are specified in the claims.

What I claim as my invention is:

1. In an electrically-operated control valve mechanism, the combination of a valve casing member, an iron-clad electromagnet having a core including an inner pole, an outer pole surrounding the inner end of the core, and a sealing member interposed between the inner end portion of said core and said outer pole and clamped therebetween whereby said electromagnet has a fluid-tight pole face, said pole face cooperating with said valve casing member to form a fluid-containing valve housing, and a control valve mounted in said housing and having an armature cooperating with said poles.

2. In an electromagnetically-operated control valve mechanism, the combination of a valve casing member, an iron-clad electromagnet having a separable core and including an inner pole, an outer pole surrounding the inner end of the core and a return magnetic circuit portion extending from said outer pole to the outer end of said core, said core having a close fit at its outer end in said return circuit portion, and a sealing member interposed between the inner end portion of said core and said outer pole and clamped therebetween whereby said electromagnet has a fluid-tight pole face, said pole face cooperating with said valve casing member to form a fluid-containing valve housing, and a control valve mounted in said housing and having an armature cooperating with said poles.

3. In an electromagnetically-operated control valve mechanism, the combination of a valve casing member, an iron-clad electromagnet having a core provided with an inner pole of less cross-sectional area than the main part of the core and forming a shoulder therewith, an outer pole extending to within a short distance of the inner pole and overlying said shoulder and a gasket interposed between said shoulder and the inner portion of the outer pole and clamped therebetween whereby said electromagnet has a fluid-tight pole face, said pole face cooperating with said valve casing member to form a fluid-containing valve housing, and a control valve mounted in said housing and having an armature cooperating with said poles.

4. In an electromagnetically-operated control valve mechanism, the combination of a valve casing member, an iron-clad electromagnet having a core provided with a pole end portion of less cross-sectional area than the main part of the core and forming a shoulder therewith, an outer pole extending to within a short distance of the inner pole and overlying said shoulder, a return magnetic circuit portion extending from said outer pole to the outer end of said core and apertured to receive and firmly engage said outer end of said core, a gasket interposed between said shoulder and the inner portion of the outer pole and cooperating therewith to form a fluid-tight pole face, and means connecting the core with said return circuit portion for moving said core relative to said outer pole to put pressure upon said gasket, said pole face cooperating with said valve casing member to form a fluid-containing valve housing, and a control valve mounted in said housing and having an armature cooperating with said poles.

5. In an electromagnetically-operated control valve mechanism, the combination of a valve casing member, an iron-clad electromagnet having a separable core and including an inner pole, a member including a disk forming an outer pole surrounding said inner pole and a yoke having a detachable connection with the outer end of said core, a coil disposed within said yoke and surrounding said core, and non-magnetic means separating the inner and outer poles and forming a fluid-tight joint therewith whereby to form a fluid-tight pole face, said pole face cooperating with said valve casing member to form a fluid-containing valve housing, and a control valve mounted in said housing and having an armature cooperating with said poles.

6. In an electromagnetically-operated control valve mechanism, the combination of a valve casing member, an iron-clad electromagnet having a separable core including an inner pole, a member including a disk forming an outer pole surrounding said inner pole and a yoke having a pressed fit connection with the outer end of said core, a coil disposed within said yoke and surrounding said core, and a gasket interposed between the inner and outer poles, said core having a flange, and clamping means connecting said flange with said yoke to move said core relative to said outer pole to clamp said gasket therebetween and thus form a fluid-tight pole face, said pole face cooperating with said valve casing member to form a fluid-containing valve housing, and a control valve mounted in said housing and having an armature cooperating with said poles.

7. In an electromagnetically-operated valve mechanism, the combination of a control valve, a housing therefor including the pole face of an electromagnet for operating said valve, said electromagnet including an outer pole and a separable core including an inner pole, a gasket of non-magnetic material interposed between said inner and outer poles, said core and outer pole of said magnet having oppositely disposed seats against which said gasket abuts and between which it is clamped to form a fluid-tight pole face, and means for holding the core and outer pole of said magnet in clamped engagement with said gasket.

In testimony whereof, I affix my signature.

LOUIS O. FRENCH.